March 7, 1933.   E. I. SPONABLE   1,900,853
APPARATUS FOR PRINTING FROM A NEGATIVE SOUND RECORD TO A POSITIVE
Filed May 15, 1929   2 Sheets-Sheet 1
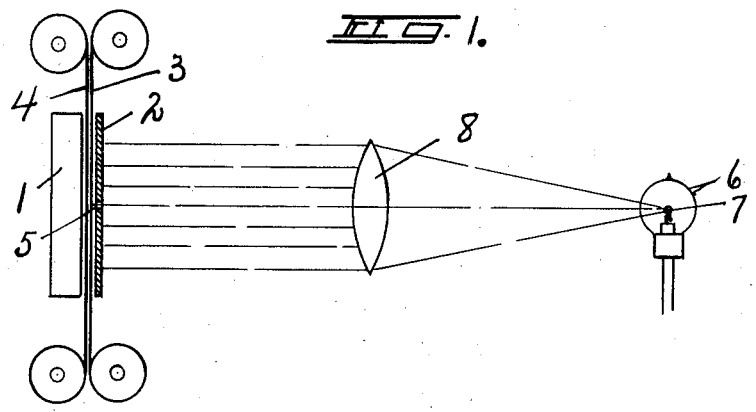
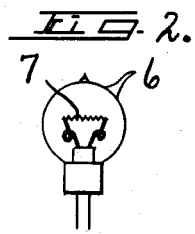
WITNESS
INVENTOR
BY ATTORNEYS Patented Mar. 7, 1933

1,900,853

UNITED STATES PATENT OFFICE

EARL I. SPONABLE, OF NEW YORK, N. Y., ASSIGNOR TO FOX CASE CORPORATION, OF NEW YORK, N. Y., A CORPORATION OF NEW YORK

APPARATUS FOR PRINTING FROM A NEGATIVE SOUND RECORD TO A POSITIVE

Application filed May 15, 1929. Serial No. 363,224.

This invention relates to certain new and useful improvements in apparatus for printing from a negative sound record to a positive.

I have discovered that a more accurate and sharply defined sound record is produced on the positive with practical absence of overlapping if the rays of light used for printing are normal to the record elements. This may perhaps preferably be effected by using a line source of light produced in any suitable way and combined with a suitable lens or lens system for causing the rays of light to pass through the usual printing slit in a direction perpendicular to the record elements.

Other objects and advantages relate to the details of the structure and the form and relation of the parts thereof, all as will more fully appear from the following description taken in connection with the accompanying drawings, in which:

Figure 1 is a diagrammatic illustration of an apparatus of this invention.

Figure 2 illustrates a suitable source of a line of light.

Figure 3:
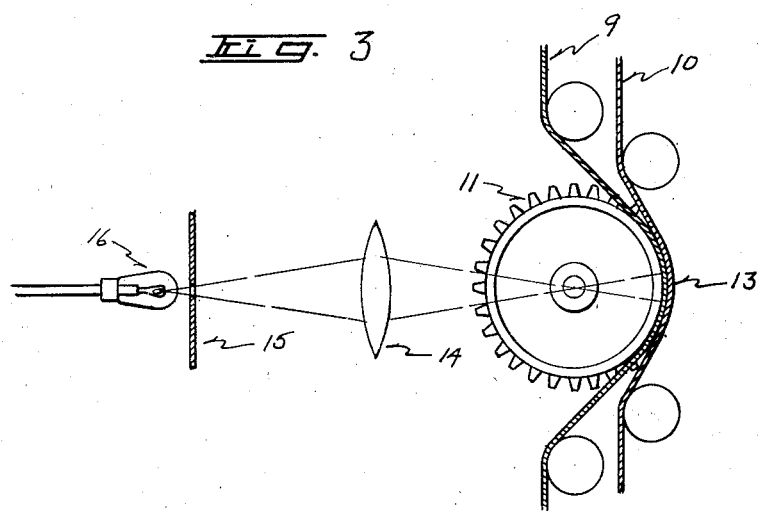
Figures 3, 4 and 5 illustrate a modified and perhaps preferred form of apparatus.

The apparatus as shown comprises a gate consisting in this instance of two plates 1 and 2 which may be positioned in any suitable well known manner to permit the passage between them of a negative record element 3 and a positive 4 in overlying relation. One of the plates of the gate, as plate 2, has a slit 5 formed therein of suitable width and length through which slit the negative 3 is exposed to light rays to thereby reproduce upon the positive a sound record element capable of reproducing the original sound recorded on the negative.

In effect the record upon the positive consists of accurate shadows of the lines on the negative.

In order to produce on the positive accurate shadows of the lines on the negative, there is utilized a line source of light 5 produced in any suitable manner, as, for instance, by a lamp 6 having a straight line filament 7, the filament extending substantially parallel with the negative 3, and the light emanating from the straight line filament 7 is passed through a lens 8 or a suitable lens system for causing the rays of light to extend from the lens 8 in a direction normal to the negative 3 at the area where the negative moves past the slot 5. The result is that lines of light are perpendicular to the negative and act therefore, to produce on the positive accurate shadows of the lines on the negative without any spreading or overlapping whereby an accurate reproduction of the sound record on the negative can be made upon the positive, and from which an accurate reproduction of the original sounds can be effected.

Figure 3 illustrates another means of printing, utilizing light rays normal to the record elements. The lamp 16 furnishes the source of light. Light from this lamp passes through a narrow elongated slit 40 in the wall 15. This beam of light enters lens 14 and is brought to a focus at the center line of the shaft supporting sprocket wheel 11. Diverging at this point, the light beam impinges on negative 9 which produces on positive 10 a sound record capable of accurately reproducing the original sound recorded on the negative. In this method the light rays are always normal to the negative at the points of exposure thereby insuring sharp and accurate shadows of the lines of the negative on the positive.

Figure 4:
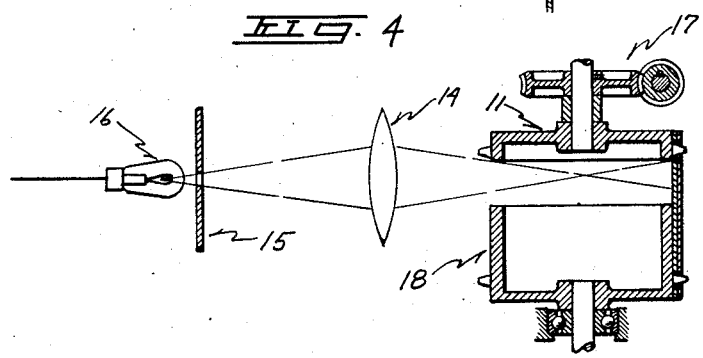

Figure 4 shows further details of the means illustrated in Figure 3. In order to allow the light beam to pass through the sprocket drum 18, the drum is separated as shown. One section of the sprocket may be driven through a worm wheel drive 17 and the other section may be similarly driven or, as shown, the second section may be driven from the first through the medium of the films.

Figure 5:
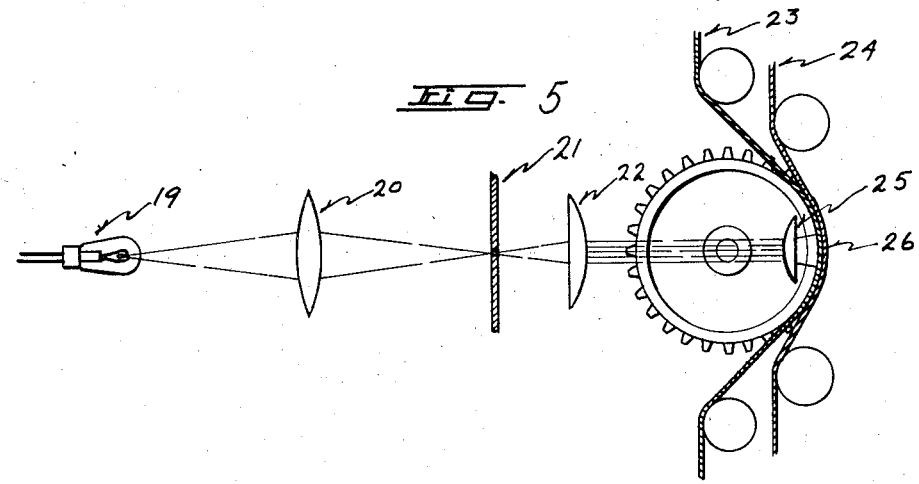

Another means of obtaining a light source normal to the negative is shown in Figure 5. Light from lamp 19 is collected by lens 20, which is brought to focus on an aperture in wall 21. The beam diverges and, as it encounters lens 22, is bent so that it proceeds to lens 21 in the form of parallel rays. Lens 25 causes it to diverge just enough so that the rays of light will strike the negative 22 normal to its surface at 26. Here again the elements of the negative 23 are reproduced on the positive 24 with a high degree of exactness.

The essential feature of this invention consists in causing the rays of light for effecting the printing to extend in a direction normal to the negative, and in addition the combination with such apparatus and means for producing a line source of light for constituting the origin of the rays of light for effecting the printing.

Although I have shown and described a specific structure and preferred details of the apparatus, I do not desire to restrict myself to the same, as various changes and modifications may be made within the scope of the appended claims.

I claim:

1. An apparatus for printing from a negative sound record to a positive comprising spaced coaxial sprocket wheel sections over which the negative and positive move in an overlying relation, means for focusing a line of light on a portion of said film exposed through the space between said sprocket sections with the rays of light substantially normal to the direction of movement of the film at the exposed line.

2. An apparatus for printing from a negative sound record to a positive comprising two spaced co-axial sprocket wheel sections over which the negative and positive move in an overlying relation, means for driving one of said sprocket wheel sections, said other sprocket wheel section being driven by said films, and means for focusing a line of light on a portion of said film exposed through the space between said sprocket sections with the rays of light substantially normal to the direction of movement of the film at the exposed line.

3. An apparatus for printing from a negative sound record to a positive comprising two spaced coaxial sprocket wheel sections over which the negative and positive move in an overlying relation, means for driving one of said sprocket wheel sections, said other sprocket wheel section being driven by said film, means for producing a line of light, and means for focusing said line of light on a portion of said films exposed through the space between said sprocket sections with the rays of light substantially normal to the direction of movement of the film at the exposed line.

4. An apparatus for printing from a negative sound record to a positive comprising spaced coaxial sprocket wheel sections over which the negative and positive move in an overlying relation, means for producing a line of light, and means for focusing said line of light on a portion of said films exposed through the space between said sprocket sections with the rays of light substantially normal to the direction of movement of the films at the exposed line.

5. An apparatus for printing from a negative sound record to a positive comprising two spaced coaxial sprocket wheel sections over which the negative and positive move in an overlying relation, means for driving one of said sprocket wheel sections, said other sprocket wheel section being driven by said film, means for producing a line of light, projecting means for bringing said line of light to a focus at the axis of and between said sprocket wheel sections and for exposing a portion of said films with rays of light from said line normal to said films.

6. An apparatus for printing from a negative sound record to a positive comprising spaced coaxial sprocket wheel sections over which the negative and positive move in an overlying relation, means for producing a line of light, projecting means for bringing said line of light to a focus at the axis of and between said sprocket wheel sections and for exposing a portion of said films with rays of light from said line normal to said films.

In witness whereof I have hereunto set my hand this 8th day of May, 1929.

EARL I. SPONABLE.